United States Patent [19]

Box

[11] Patent Number: 4,982,401
[45] Date of Patent: Jan. 1, 1991

[54] METHOD AND APPARATUS FOR DETECTING TRANSMISSION ERRORS IN CORDLESS TELEPHONES

[75] Inventor: Jay C. Box, Garland, Tex.
[73] Assignee: Tandy Corporation, Fort Worth, Tex.
[21] Appl. No.: 215,740
[22] Filed: Jul. 6, 1988
[51] Int. Cl.$^5$ .......................... H04Q 7/04; G06F 11/00
[52] U.S. Cl. ...................................... 371/2.1; 371/67.1; 379/62
[58] Field of Search .................. 371/2, 67, 69, 2.1, 371/67.1, 69.1; 379/61, 62, 63

[56] References Cited

U.S. PATENT DOCUMENTS

| | | | |
|---|---|---|---|
| 4,394,642 | 7/1983 | Currie et al. | 371/2 |
| 4,467,140 | 8/1984 | Fathauer et al. | 379/62 |
| 4,564,941 | 1/1986 | Woolley et al. | 371/2 |
| 4,593,155 | 6/1986 | Hawkins | 379/62 |
| 4,639,550 | 1/1987 | Yamagawa et al. | 379/62 |
| 4,723,246 | 2/1988 | Weldon, Jr. | 371/2 |
| 4,736,404 | 4/1988 | Anglikowski et al. | 379/62 |
| 4,794,636 | 12/1988 | Sanglier et al. | 379/62 |
| 4,833,702 | 5/1989 | Shitara et al. | 379/60 |

*Primary Examiner*—Charles E. Atkinson
*Attorney, Agent, or Firm*—Wolf, Greenfield & Sacks

[57] ABSTRACT

The invention provides means for detecting errors in the transmission of protocol data words between the handset station and base station of a cordless telephone set. Assuming the protocol data words are eight bits in length, a sixteen bit security code word is provided which consists of a high security byte and a low security byte. At the transmitting station (either the hand set or base), the protocol data byte is exclusive-ored with both the high security byte and the low security byte. The two resulting bytes are appended to the original protocol data byte to form a twenty-four bit error detection code. This error detection code is transmitted to the receiving station. The receiving station takes the unaltered protocol byte portion of the three byte word and exclusive-ors it with both of the other bytes of the received word. If there were no transmission errors, the sixteen bit security code should be generated by the exclusive-oring step. If the resulting sixteen bit word does not match the security code stored in the memory of the receiving station, then an error is indicated and the receiving station request a retransmission of the data.

32 Claims, 8 Drawing Sheets

SECURITY CODE WORD- HHHHHHHH LLLLLLLL

PROTOCOL DATA WORD- MMMMMMMM

PRIOR ART- HHHHHHHH LLLLLLLL MMMMMMMM
                                                                          EEEEEEEE VALIDATION CODE- HMLHMLHMLHMLHMLHML HMLHML
                                                                    EE

SECURITY CODE WORD- HHHHHHHHLLLLLLLL

PROTOCOL DATA WORD- MMMMMMMM

PRIOR ART- HHHHHHHHL LLL LLLL EEEEEEEE
MMMMMMMM
EE
VALIDATION CODE- HMLHMLHMLHML HMLHML HML HML

```
         MMMMMMMM
         HHHHHHHH        MMMMMMMM
X-OR     TTTTTTTT  X-OR  LLLLLLLL
                         VVVVVVVV

TRANSMIT: TTTTTTTT        VVV VVVVV
ERROR
DETECTION
CODE
```

FIG. 3

```
RECEIVED: TrTrTrTr Tr Tr Tr Tr    VrVr VrVrVrVrVrVr
          Tr Tr Tr Tr Tr Tr Tr Tr VrVrVrVrVrVrVr Vr      MMMMMM
X-OR      MrMrMrMrMrMrMrMr   X-OR MrMrMrMrMrMrMrMr
          HR HR HR HR HR HR HR HR LR LrLrLrLrLrLrLR      MrMrMrMrMrMrMr
```

FIG. 4

RECEIVED: Tr Tr Tr Tr Tr Tr Tr Tr        Vr Vr Vr Vr Vr Vr Vr Vr        Mr Mr Mr Mr Mr Mr Mr Mr

Tr Tr Tr Tr Tr Tr Tr Tr              Vr Vr Vr Vr Vr Vr Vr Vr
H H H H H H H H                      L L L L L L L L
―――――――――――――                        ―――――――――――――
Mr Mr Mr Mr Mr Mr Mr Mr              Mr Mr Mr Mr Mr Mr Mr Mr

M M M M M M M M                    M M M M M M M M
X-OR      H H H H H H H H      X-OR          L L L L L L L L
          T T T T T T T T                    V V V V V V V V
          ―――――――――――――                      ―――――――――――――

ERROR
DETECTION  T T T T T T T T              V V V V V V V V
CODE

*FIG. 5*

TRANSMIT: T V M T V M T V M T V M T V M T V M        M M M M M M M

METHOD AND APPARATUS FOR DETECTING TRANSMISSION ERRORS IN CORDLESS TELEPHONES

BACKGROUND OF THE INVENTION

1. Field of the Invention

This invention relates to cordless telephones. More particularly, the invention concerns a method and apparatus for detecting errors in the transmission of digital command words used to control communication protocol between the base and handset of a cordless telephone set.

2. Background Discussion

Cordless telephones normally consist of two separate stations, a base station and a handset station. The base station is plugged into a telephone outlet and comprises all the necessary equipment and electronics for interfacing with the local telephone trunk. The handset station comprises all the electronics and equipment necessary for interfacing with the user of the telephone. Such equipment includes a touch-tone key pad for dialing telephone calls and providing other features, as well as a speaker and microphone. Both stations also include radio transceivers and antennae for radio communication between the handset and the base station.

Since the base station is essentially stationary and usually must be hardwired to a telephone outlet, it will typically receive its electrical power supply from an AC wall outlet. The telephone handset, however, is intended to be portable and therefore cannot be designed for connection to an AC power outlet. Therefore, the handset receives its power from an on-board battery pack. Typically, the batteries are of the rechargeable type, and are recharged when the handset is placed in an accepting cradle on the base station and electrically coupled to the base station power supply via a recharge circuit.

In addition to the actual conversation that takes place on the telephone, digital signals for governing protocol between the two separate stations are also transmitted. Typically, protocol control is carried out by transmitting digital command words and digital acknowledgement words (digital data words, collectively) between the two stations. This may be accomplished on a separate frequency or channel than the voice communications or may be accomplished directly over the voice frequency channels. When transmitting digital words through the air via radio signals, there is a possibility that the transmitted data may not be received correctly at the receiving station. Unfortunately, there is a substantial amount of radio frequency interference and noise which could effect the integrity of the transmitted data, particularly as the distance between the base station and handset increases.

In order to transmit the protocol data words from one station to another, the words are multiplexed onto a single channel and the bits are sent sequentially through the air to the receiving station s antenna. Most noise and interference which effects the integrity of data transmissions in cordless telephone systems consists of bursts of interference of varying duration. An interference burst may effect the validity of only one or two received bits, if the interference is of particularly short duration, or of the entire word if it is of longer duration.

Prior art cordless telephone sets sometimes appended a security code to the protocol data word in order to provide an error detection method and a source identification method. In these cordless telephones, the security code word is stored in the memory of both the base station and the handset station. When a protocol transmission is necessary between stations, the security code is appended to the protocol word to form a validation code which is then transmitted. For instance, if protocol signalling is accomplished by using an eight bit protocol word, instead of simply sending the eight bit protocol command word, the transmitting station sends a sixteen bit word consisting of the protocol command as the high byte and the security code as the low byte. The receiving station reads the transmitted word and compares the security byte portion of it with the security code that it has stored in its memory. The security byte also serves to provide source identification to the receiving station. Each telephone set, comprising a base station and a handset station, is programmed with a different security code, thereby preventing two telephone systems located in the same transmitting vicinity from causing crosstalk between the two separate systems. A transmission from the handset or base of one system will not be accepted by the other system because it will not recognize the security code. If there is a match, then it is likely that the entire transmitted word has been received correctly and the receiving station accepts the protocol word as being correct. This type of error detection, however, is far from perfect. Short duration interference bursts causing errors can go entirely undetected. For instance, in the above example of an eight bit security code and an eight bit protocol word, errors up to eight bits long can go entirely undetected. If an eight bit burst error occurs during the protocol command portion of the transmitted word rather than the security code portion, the security code would be received correctly and the receiving station would accept the protocol word as correct.

In addition to noise and random interference, cordless telephones are particularly susceptible to intentional "false" transmissions. Particularly, unauthorized use of the base station of a cordless telephone set can be made from other transceivers. Another person knowing the transmitting frequency and protocol system of the cordless telephone set, can use a transceiver to simulate the handset of the cordless telephone and make unauthorized calls using the base station of the cordless telephone or tap into private telephone conversations.

Therefore, it is an object of the present invention to provide an improved cordless telephone set.

It is another object of the present invention to provide a cordless telephone in which it is extremely difficult to make unauthorized telephone calls using a remote transceiver.

It is a further object of the present invention to provide an improved means for detecting transmission errors in a cordless telephone.

It is still another object of the present invention provide a cordless telephone set that can correct for certain transmission errors.

SUMMARY OF THE INVENTION

The present invention provides several methods and apparatus for detecting transmission errors between the base station and handset station of a cordless telephone set. One method consists of interleaving the bits of the protocol data word with the bits of a security code word before transmission. More particularly, assuming the protocol system of the telephone set utilizes eight bit protocol data words, a sixteen bit security code word is generated by the microcomputer of the base station consisting of a high security byte and a low security byte. Both the base station and the handset station store the security code word in memory. Additionally, the security code word will be updated at random intervals in time in order to decrease the chances of unauthorized use of the cordless telephone. The microcomputer in the base station alters the security code at random points in time and communicates the new security code word to the handset station when the handset is placed in the cradle of the base station during battery recharge periods.

For purposes of the example embodiments of the invention, the protocol data words will be assumed to be eight bits in length. In such a situation, the security code word consists of sixteen bits. A validation code is generated at the currently transmitting station (which may be either the base station or handset station) by interleaving the eight bits of the protocol data word with the sixteen bits of the security code such that the adjacent bit on either side of each protocol data word bit is the corresponding bit of the high security byte and low security byte, respectively. This validation code is transmitted from the transmitting station to the receiving station. The microcomputer of the receiving station reconstructs the security code and the protocol data word from the received validation code and compares the security code portion with the security code stored in its memory. If there is a match, the receiving unit accepts the protocol data word portion as being correct. The interleaving of the bits of the security code with the protocol data word assures that any burst error greater than one bit in duration absolutely must effect a bit of the security code.

A second and more preferred method is to exclusive-or the protocol data word with both the high byte of the security code word and the low byte of the security code word and create a twenty-four bit error detection code (assuming a eight bit protocol data word) consisting of the two bytes generated by the exclusive-oring step (first and second bytes) and the actual protocol command word (third byte). The twenty-four bit word is transmitted to the receiving station, which, upon receipt of the information packet, exclusive-ors the first and second bytes of the received word with the third byte of the received word. The resulting two bytes should match the security code stored in memory if there were no transmission errors. If the two bytes match, then the receiving station accepts the third byte as the correct protocol data word. This second method assures that a burst of even only one bit duration can be detected. In addition, if desired, a very simple error correction routine can also be implemented by accepting the protocol byte if one of the security bytes matches. Such a method is basically a two out of three election.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION OF THE INVENTION

Figure 1:
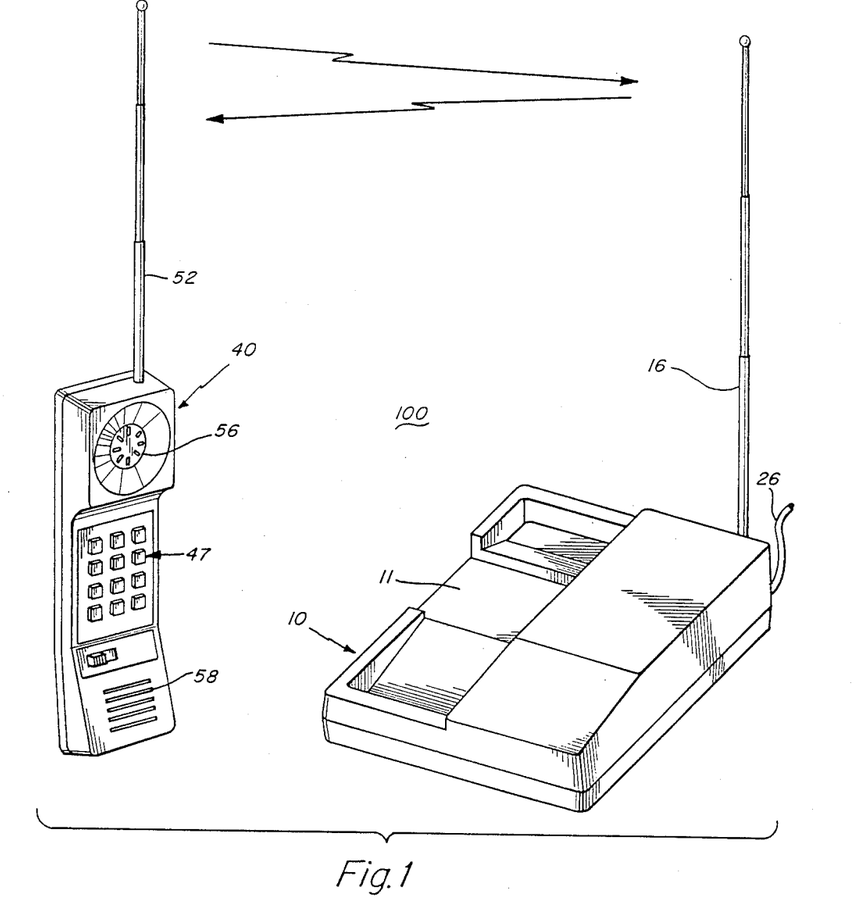
FIG. 1 shows a pictorial view of the cordless telephone of the present invention.
Figure 2:
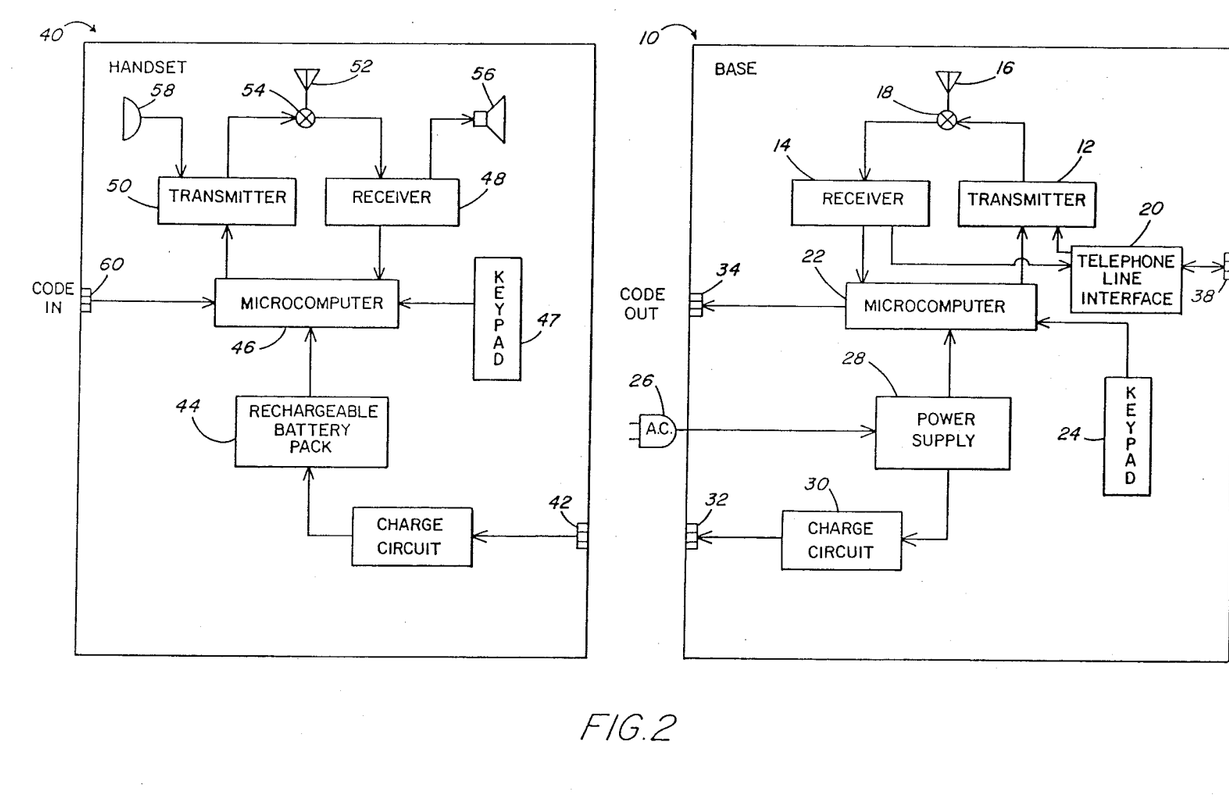
FIG. 2 shows a block diagram of the cordless telephone set of the present invention.

FIGS. 1 and 2 show a pictorial view and a general block diagram of the major components of the handset station 40 and base station of the present invention respectively. The base station 10 is equipped with a transmitter 12 and receiver 14 interfaced to an antenna 16 through a mixer 18 in order to allow radio frequency communication with the handset station 40. The transmitter 12 and receiver 14 ar further coupled to block 20, which generally represents the circuitry necessary for interfacing with the local telephone trunk through electrical connector 38. The transmitter 12 and receiver 14 are further coupled to the microcomputer 22, which oversees all functions of the base station, including protocol signaling between stations. A keypad 24 for providing various function options to the user of the telephone is also included. The unit receives its power from the local source of AC power 26.

The power supply 28 converts the power from the AC power source 26 into a useable power source for the microcomputer. Additionally the power supply 28 is connected through charge circuit 30 to an outlet electrical connector 32 which can be electrically connected to the power-charge electrical connector 42 of the handset station 40 in order to charge the rechargeable battery pack 44 of the handset station 40.

The base station is equipped with a cradle 11 for accepting the handset station 40 therein. Normally, the handset station will be in a place remote from the base station, however, when the handset station battery needs recharging, it can be placed in the cradle 11 of the base station. The cradle is designed to cause electrical connector 32 on the base station to contact electrical connector 42 on the handset station so that the power supply 28 of the base station can recharge the rechargable battery pack 44 of the handset station.

The handset station 40 includes its own microcomputer 46 for controlling all system functions. A keypad 47 is provided to allow the user to dial numbers and select other features of the telephone set. The handset, of course, also includes a receiver 48 and transmitter 50 coupled to an antenna 52 via mixer 54 in order to allow communication with the base station 10. The receiver is further coupled to a speaker 56 of the telephone while the transmitter is coupled to the microphone 58.

The base station and handset station are further provided with electrical connectors 34 and 60, respectively, for transferring a security code word therebetween. When the handset 40 is placed in the cradle portion of the base station 10 for recharging, the code transfer electrical connectors 34 and 60 electrically engage in the same manner as the recharge electrical connectors 32 and 42. This allows the base station to recharge the battery pack 44 of the handset station and further allows the microcomputer 22 of the base station 10 to communicate new security codes to the handset station when the handset is engaged in the cradle of the base station.

As discussed in the background discussion herein, in addition to the telephone conversation which is transmitted between the handset and base stations, signaling protocol data is also transferred. In order to ensure that the protocol data word has been correctly received at the other end of the transmission, this invention provides a simple but very effective means for ensuring the integrity of the transmitted protocol data.

In one preferred embodiment of the present invention, the protocol data is contained in an eight bit digital word. In FIGS. 3-6 the protocol data word is represented by MMMMMMMM. The microcomputer of the base station generates a security code word having twice as many bits as the protocol data words for use in the error detection scheme. In the embodiment discussed herein, the security code would have sixteen bits and would consist of a high security byte and a low security byte. In FIGS. 3-6 the high security byte is represented by HHHHHHHH and the low security byte is represented by LLLLLLLL.

The base station microcomputer stores the security code word in its memory and also transfers the security code word to the microcomputer of the handset station via a data bus created by the connection of electrical connectors 34 and 60. The microcomputer of the handset station reads the security code word from the data bus and stores it in its own memory. At random intervals in time, the microcomputer of the base station generates a new security code and communicates it to the microcomputer of the handset station when the handset station is secured in the cradle of the base station. The random altering of the security code makes it extremely difficult for someone to make unauthorized use of the cordless telephone set because the security code word keeps changing.

Instead of simply appending the security code word to the protocol data word, as was done in the prior art, the telephone of the present invention interleaves the bits of the security code with the bits of the protocol data word in order to create a validation code for transmission to the other station.

Figure 3:
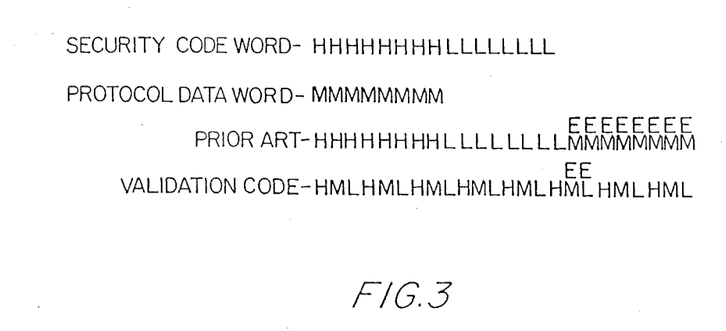
FIGS. 3 through 6 show various alternative implementations of the error detection method of the present invention.

Referring to FIG. 3, the sixteen bit security code word is represented by the sixteen letter representation consisting of HHHHHHHHLLLLLLLL. The protocol data word is represented by MMMMMMMM. The validation code is shown on the third line of FIG. 3. It is a twenty four bit word created by interleaving the bits of the security code word and the protocol data word so as to "sandwich" each bit of the protocol data word between two security code word bits, as shown. The twenty-four bit validation code is transmitted, and upon reception of the validation code, the microcomputer of the receiving station breaks apart the validation code and reconstructs the security code and protocol data word therefrom. If the reconstructed security code matches the security code stored in the memory of the receiving station, then the microcomputer accepts the reconstructed protocol data word as also being correct. As illustrated in FIG. 3 where the letter E represents a bit error, if the security code word was simply appended to the protocol data word, as was done in the prior art then it is possible for a burst error of up to eight bits in length to go entirely undetected. However, as shown in FIG. 3, any burst error greater than one bit in length absolutely effects the validity of the security code word. Of course, this is not to say that any noise burst lasting greater than 1 bit in length and effecting the validity of the protocol data word will be detected. It is always possible that a multi-bit burst error which "effects" a bit or bits of the security code (i.e., is received simultaneously therewith) may not actually change its value. For example, if a two bit burst error "effects" a security code bit, H, and the adjacent protocol bit, M, of the validation code, it may alter the value of the M bit but not the H bit. Such an error would not be detected.

Figure 4:
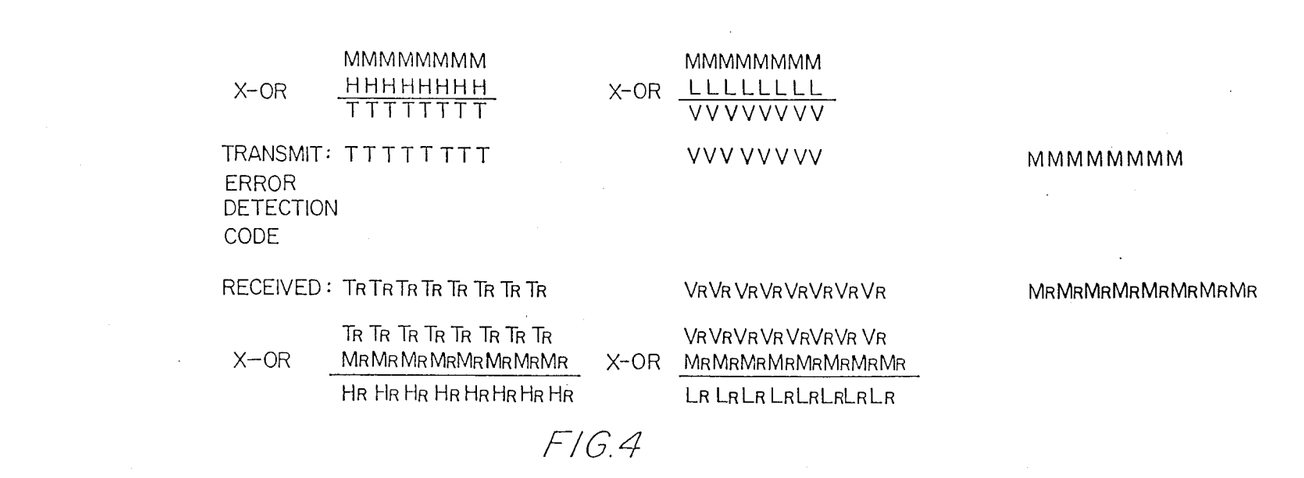

FIG. 4 shows an alternative, and more preferred, method of improving the error detection rate. Once again, the high security byte is represented by HHHHHHHH, the low security byte is represented by LLLLLLLL and the protocol data word is represented by MMMMMMMM. The term "error detection code" is used to describe the twenty four bit word which is generated and transmitted in the embodiment of FIG. 4, simply to differentiate from the validation code of the embodiment of FIG. 3. The first byte of the error detection code is generated by exclusive oring the protocol data word with the high security byte, as shown in FIG. 4. The second byte of the error detection code is generated by exclusive-oring the protocol data word with the low security byte. The third byte of the error detection code is the unaltered protocol data word. The error detection code is transmitted to the receiving station where the first, second and third bytes of the received error detection code are broken apart and the third byte (the unaltered protocol data word) is stored in memory. The first and second bytes are both exclusive-ored with the third byte. If there was no transmission error, the result of the exclusive-oring of the first and third bytes should be the high security byte. Likewise, the result of the exclusive oring of the second and third bytes should be the low security byte. The microcomputer of the receiving station compares the results of the exclusive-oring operation with the security code word stored in its memory. If both the high and low security bytes match, then the third byte is accepted as the correct protocol data word. If the resulting sixteen bit word does not match the security code word stored in memory, then the receiving station transmits a message to the transmitting station requesting a retransmission of the data. The method of FIG. 3 guarantees that a burst, even of only one bit in length, absolutely will effect a bit of the reconstructed security code.

This second method is more accurate in detecting transmission errors than the first method disclosed. In fact, the only way for an error in the third byte of the error detection code to not be detected, is if the bit in the corresponding position of both the first and second bytes of the error detection code are also altered in value. For example, if an error appears in the most significant bit of the third byte of the error detection code, the error will be detected unless the most significant bit of both the first and second bytes of the error detection code also were altered. Otherwise, either one or both of the reconstructed security code bytes will not match the corresponding security code bytes stored in memory. When it is considered that this same relation holds true for the other seven bits of each byte of the error detection code, it is clear that the probability of a transmission error being undetected is extremely low.

Figure 5:
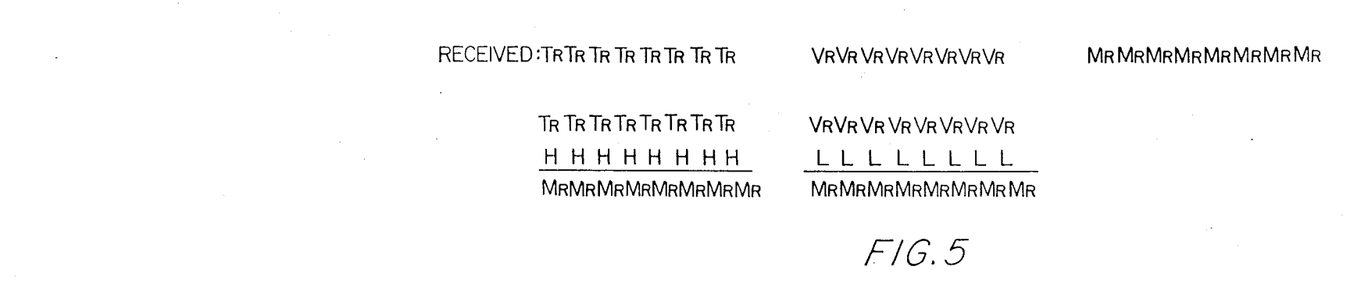

An alternative, but substantially similar method, to the method shown in FIG. 4 is illustrated by FIG. 5. The error detection code is generated at the transmitting station in exactly the same manner as discussed in relation to FIG. 3. However, instead of exclusive-oring the first and second bytes of the received error detection code with the third byte of the received error detection code, they are instead exclusive-ored with the high security byte and low security byte stored in the memory of the receiving station, respectively. Assuming that there were no transmission errors, then the result of both exclusive-oring operations should be the protocol data word that was transmitted. Therefore, if the two reconstructed bytes match, they are accepted as the correct protocol data word. This method is slightly less accurate than the previously described one.

Whereas in the method illustrated in FIG. 4, an error must occur in the corresponding bit of all three bytes of the error detection code in order to go undetected, in the method of FIG. 5, the correspondence must be between only the first and second bytes in order for the error to go undetected. The required bit correspondence for an error to go undetected can be increased to all three bytes of the error detection code, if a step is added wherein the protocol data word reconstructed from the first and second bytes of the error detection code are further compared with the third byte in order to determine if there is a three way match. This method, however, requires additional microcomputer time and power in order to achieve the same level of accuracy as the method in FIG. 4.

Figure 7:
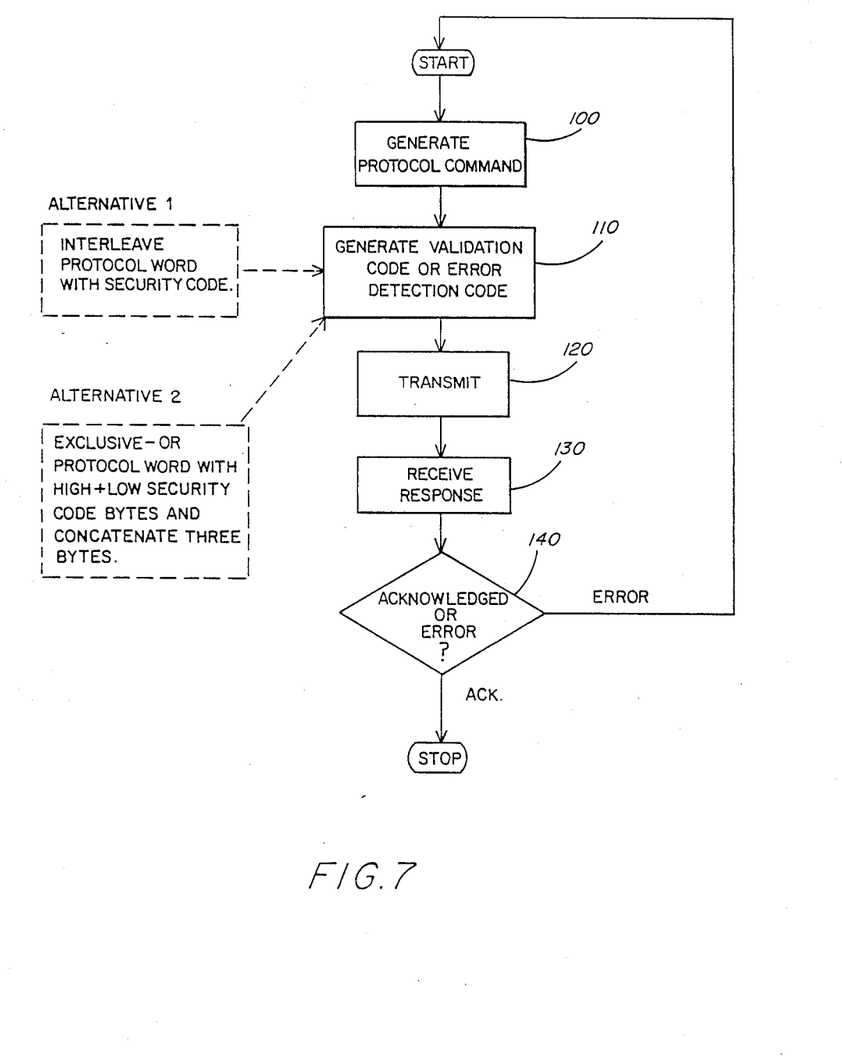
FIGS. 7 and 8 illustrate flow charts of the various alternative implementations of the error detection method of the present invention.
Figure 8:
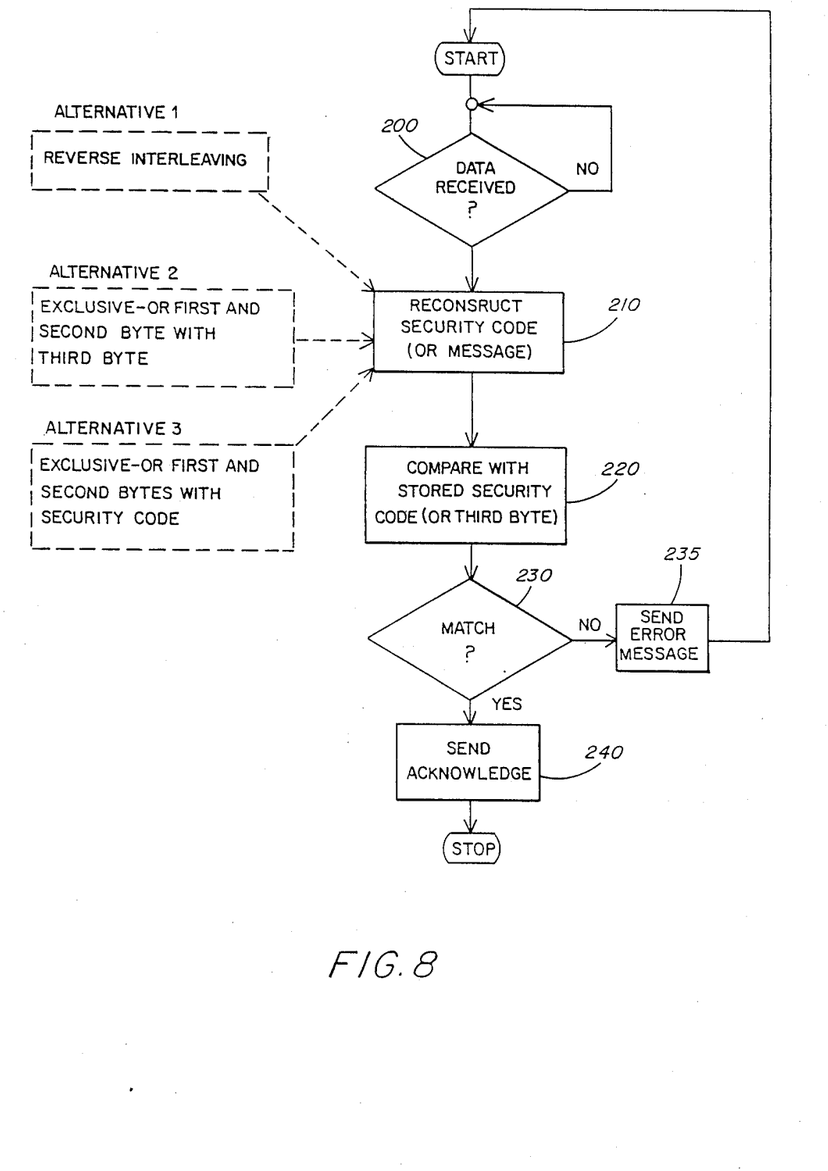

FIGS. 7 and 8 illustrate flow charts of the operation of the transmitting station and receiving station, respectively, in a cordless telephone using the above described error detection method. In step 100 of FIG. 7, the microcomputer of the transmitting station generates a protocol command byte based on the keystrokes of the user of the telephone. In step 110, the validation code (if using the method of FIG. 3), or error detection code (if using the method of FIGS. 4 or 5) is generated. The two alternatives, as described above, are shown in dotted outline to the left of the flow chart. In step 120, the validation code (or error detection code) is transmitted.

Now regarding FIG. 8 and the receiving station, the data is received in step 200 In step 210, the microcomputer of the receiving station reconstructs the security code or protocol data byte, in one of the three possible manners disclosed above from the received data. Once again, the three possible methods are shown in dotted outline to the left of the flow chart in FIG. 8. In step 220, the reconstructed bytes are compared with the stored security code (if using the methods of FIGS. 3 or 4) or the third byte of the received word (if using the method of FIG. 5). If a match is detected in step 230 the microcomputer of the receiving station sends an acknowledge signal, step 240. If an error is detected the microcomputer of the receiving station sends an error detected message back to the transmitting unit in step 235.

Returning to FIG. 7, in step 130 the transmitting unit receives the response from the receiving unit as shown in FIG. 8. This response can be either an acknowledgement or an error message. If, in step 140, an error signal is detected, the programming loops around and retransmits the message. If an acknowledgement is received in step 140 then a successful transmission has been completed.

Using the error detection method of either of FIGS. 3 or 4, one can also implement a very simple error correction scheme. For instance, in the FIG. 3 embodiment, if only one rather than two of the reconstructed security bytes matched the corresponding security byte stored in memory, then the received protocol data byte portion could be accepted as correct. Note that each of the two reconstructed bytes of the received error detection code contains information which defines the received protocol data byte and a byte of the security code. Therefore, if a match is indicated, then either the protocol byte and security byte were both received correctly or an error or errors occured in corresponding bit positions of each byte (e.g bit position 5 of both bytes).

The error correction method just described is simply a two out of three vote in which the byte indicating that an error has been received is thrown out. Of course, if neither of the reconstructed bytes matches the corresponding security byte stored in memory, then the data packet is not accepted as correct. A very similar error correction scheme can be implemented in the embodiment of FIG. 4 by comparing the two reconstructed bytes with the third byte of the received error detection code. If two of the three match then the matching pair are accepted as correct. By accepting those packets wherein only two of the three received words match, the two out of three voting scheme, increases the number of error laden packets which are erroneously accepted as error free. The two out of three voting scheme increases the possibility of acceptance of alien packets as correct and therefore also increases the possibility of phone tapping. The two out of three voting may be used only in the lower security pathway of base to handset transmissions in order to decrease the possibility of unauthorized use of the base for outgoing calls.

Figure 9:
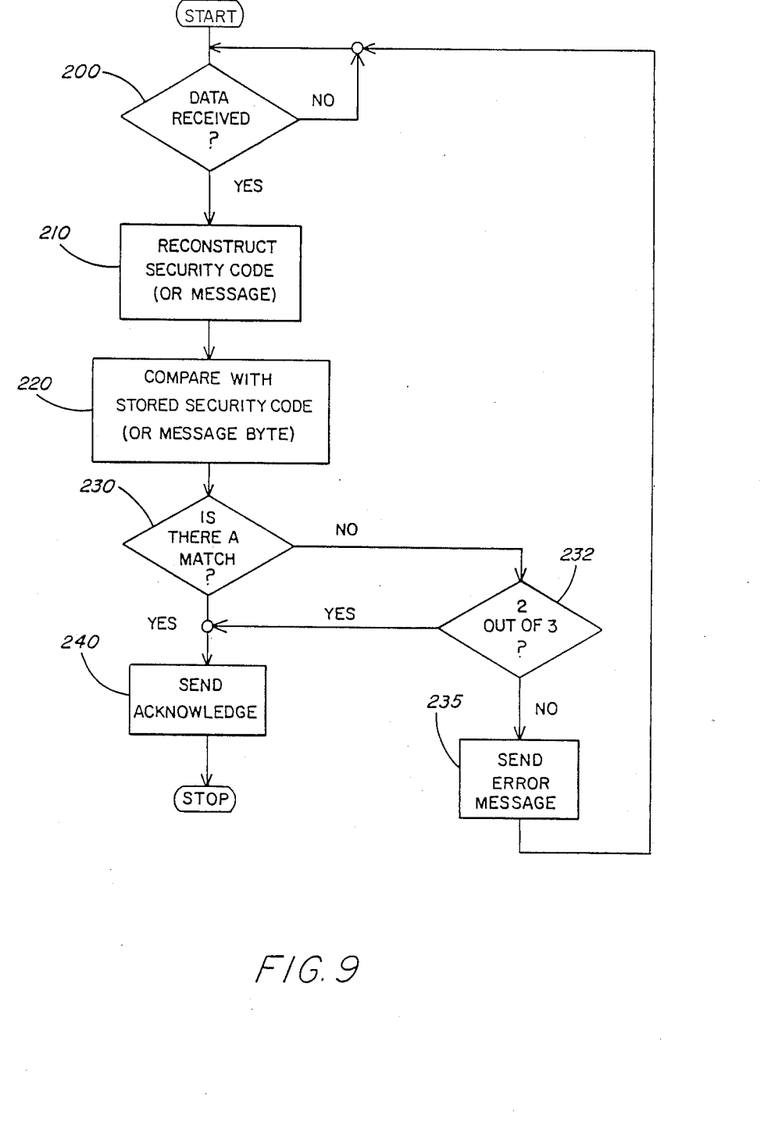
FIGS. 9 and 10 illustrate two alternative methods of correcting errors in the error detection method of the present invention.

FIG. 9 illustrates a flow chart of the error correction method disclosed above. Steps 200, 210, 220, 230, 235 and 240 are exactly the same as illustrated in FIG. 8. Step 232 is added to show the two out of three vote. If two out of three bytes of the error detection code indicate a correct transmission, then an acknowledgement is sent in step 240. Otherwise an error message is sent in step 235.

Figure 10:
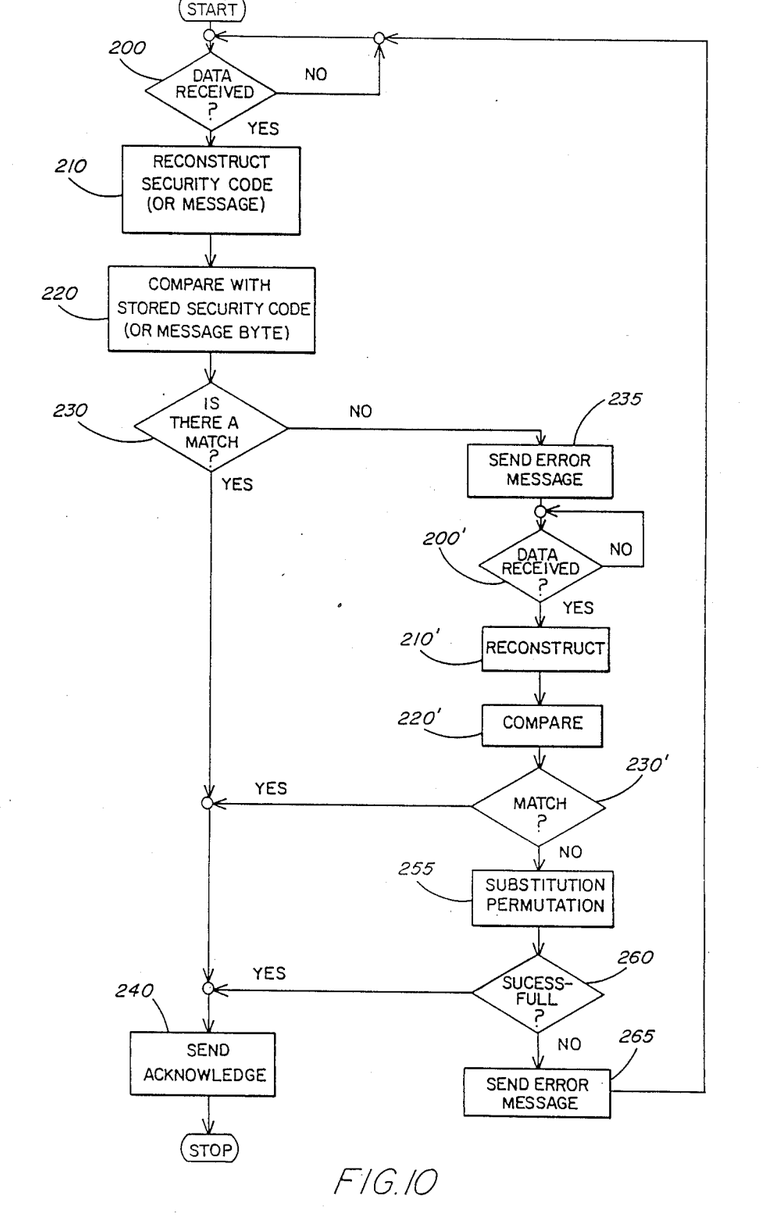

Since the occurrence of a bit error in corresponding bit positions of two of the three bytes of the error detection code would cause an erroneous protocol byte to be accepted as correct, the above described error correction method may not be acceptable for certain uses. If error correction is deemed necessary, a better method than the one just described would be to attempt error correction only after an error has been detected and a retransmission sent and rejected again. This is shown in the flow chart of FIG. 10. If the original error correction code and the retransmitted error correction code differ by only a few bits, a substitution permutation could be run to build a corrected packet from the two rejected packets. To be successful, the errors must occur on distinct bits and be few enough for all permutations to be run in an acceptable time period. This method, however, would be taxing on the microcomputer and require a relatively large amount of RAM o ROM and therefore should be used only if deemed necessary. Most of the flow chart of FIG. 10 is similar to that of FIG. 8. The common steps of flow charts of FIGS. 8 and 10 are given common numbers. In this second error correction method, error correction is attempted only after an error has been detected and a retransmission sent and rejected again. If an error is detected in the first transmission, an error message is sent to the transmitting station in the same manner as the original data (see steps 200 to 235). The retransmitted data is then checked in the same manner as the original data (see steps 200' to 230') and, if the data is received correctly, then no error correction is required and step 230' sends the programming control to step 240 where an acknowledgement is sent to the transmitting station. However, if an error is detected on the second try, then a substitution permutation is performed in step 255. If the substitution permutation reconstructs the protocol data byte successfully in step 260, then programming is returned to step 240 and an acknowledgement signal is sent to the transmitting station. If, however, the substitution permutation does not yield a correct protocol byte, then an error message is again sent to the transmitting station in step 265.

Figure 6:
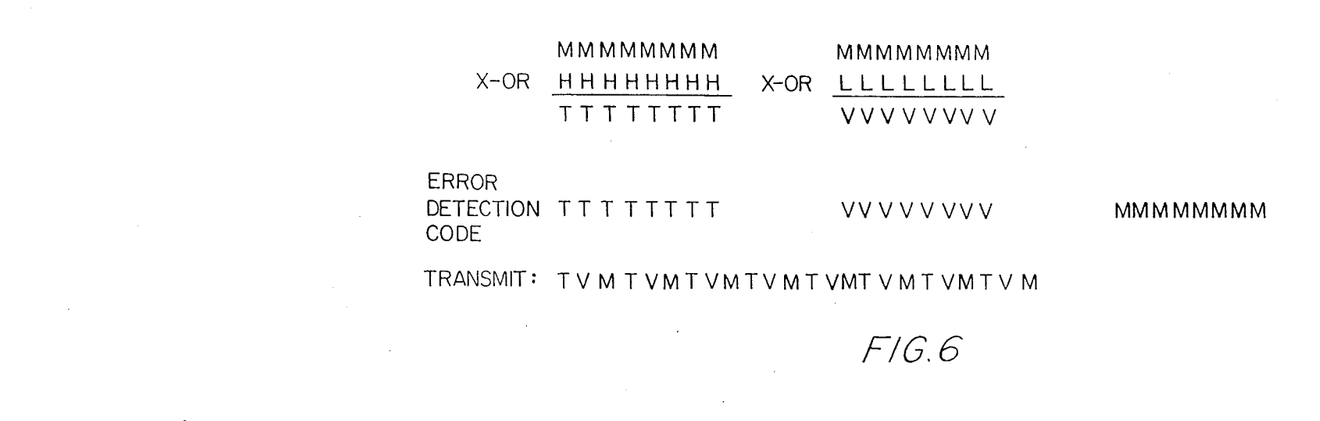

A third possible method of generating an error detection code is illustrated in FIG. 6. This method is basically a combination of the interleaving method disclosed in relation to FIG. 3 and the exclusive-oring method disclosed in relation to FIGS. 4 and 5. In this method, an error detection code is generated exactly as discussed in relation to FIG. 4 or 5. However, instead of transmitting this error detection code, the three bytes of the error detection code are interleaved as was done in relation to the FIG. 3 embodiment. The receiving station's microcomputer reconstructs the three bytes of the error detection code from the received word and performs the exclusive oring step as discussed in relation to FIG. 4 or FIG. 5. The advantage of the third embodiment is improved security from unauthorized use of the telephone. In this third method, there is no "constant field" which could be easily identified as the security code.

Having described several possible embodiments of the present invention, it should be obvious to persons skilled in the related arts that various obvious alterations and modifications of the invention are possible. Such obvious variation and modifications are intended to be included within the scope of the invention which is limited only by the appended claims.

I claim:

1. A method of detecting probable errors in a digital command byte transmitted between first and second stations of a cordless telephone, comprising the steps of:
   storing a digital security code at the first and second stations;
   generating a validation code at the first station by interleaving the bits of the security code with the bits of the digital command byte;
   transmitting the validation code from the first station to the second station;
   comparing the security code portion of the received validation code to the stored security code at the second station to determine if they match.

2. A method as set forth in claim 1 further comprising the step of:
   sending a first signal from the second station to the first station if a match is detected and sending a second signal from the second station to the first station if a match is not detected.

3. A method as set forth in claim 1 wherein;
   said security code comprises a high security byte and a low security byte, each portion having X bits, where X is the number of bits comprising the digital command byte; and
   wherein the validation code generating step is accomplished by interleaving the corresponding bits of the high security byte, command byte, and low security byte, respectively, from most significant bit to least significant bit.

4. A method as set forth in claim 3 further comprising the consecutive steps of:
   generating new security codes at random points in time; and
   storing the new security code at both the receiving station and the transmitting station.

5. A method as set forth in claim 4 wherein the first and second receiving stations are transceivers, each capable of functioning as the transmitting station and the receiving station.

6. A cordless telephone set wherein command data is transmitted between stations in the form of a digital command byte having X bits comprising:
   a handset station;
   a base station hardwired to a telephone communication outlet and having a cradle for engaging the handset station;
   means, within the base station, for generating security codes having 2X bits at random points in time comprising a high security byte and a low security byte;
   means for communicating the current security code to the handset station when the handset station is engaged within the base station cradle;
   means, within each station, for storing the current security code;
   means, within each station, for generating a validation code by interleaving the bits in the corresponding bit positions of the high security byte, command byte and low security byte, respectively;
   means, within each station, for transmitting the validation code to the other station;
   means, within each station, for receiving the transmitted validation code;
   means, within each station, for comparing the security code portion of the validation code with the stored security code to determine if they are identical.

7. A method of detecting probable transmission errors in a digital command byte having X bits transmitted between first and second stations of a cordless telephone comprising the steps of:
   storing a security code at each station, the security code comprising a high security byte having X bits and a low security byte having X bits;
   generating a high error-detection-byte by exclusive-oring the command byte with the high security byte;
   generating a low error-detection-byte by exclusive-oring the command byte with the low security byte;
   generating a 3X bit error detection code by appending the command byte and the high error-detection-byte to the low error-detection-byte;
   transmitting the error detection code from the first station to the second station;
   receiving the transmitted error detection code at the second station;
   exclusive-oring the high error-detection-byte with the high security byte stored in memory at the second station to produce a high received command byte;
   exclusive-oring the low error-detection-byte with the low security byte stored in memory at the second station to produce a low received command byte;
   comparing the high received command byte with the low received command byte at the second station to determine if they match.

8. A method as set forth in claim 7 further comprising the steps of:
   transmitting an error detected signal from the second transceiver station to the first transceiver station requesting a retransmission of the data, if the high received command byte and low received command byte do not match.

9. A method as set forth in claim 8 further comprising the consecutive steps of:
   generating new security codes at random points in time; and
   storing the new security code at the first station and the second station.

10. A method as set forth in claim 9 wherein the first station comprises a handset station of a cordless telephone set and the second station comprises a base station of a cordless telephone set.

11. A method as set forth in claim 7 further comprising the steps of:
   comparing the high received command byte and the low received command byte with the command byte of the received error detection code, if the high and low received command bytes are not identical;
   acknowledging the correct transmission of the command byte if either the high or low received command byte is identical to the command byte of the error detection code.

12. A method as set forth in claim 8 further comprising the steps of:
   storing the error detection code in memory at the second station;
   retransmitting the error detection code from the first station to the second station in response to an error detected signal from the second station;
   receiving the retransmitted error detection code at the second station;
   exclusive-oring the high error detection byte with the high security byte stored in memory at the second station to produce a second high received command byte;
   exclusive-oring the retransmitted low error detection byte with the low security byte stored in memory at the second transceiver station to produce a second low received command byte;
   comparing the second high received command byte with the second low received command byte to determine if they are identical;
   performing a substitution permutation on the received error detection code and the retransmitted error detection code to produce the digital command byte therefrom if the second high received command byte and second low received command byte are not identical.

13. A method of detecting transmission errors in a digital command byte having X bits transmitted between first and second stations of a cordless telephone comprising the steps of:
   storing a security code at each station, the security code comprising a high security byte having X bits and a low security byte having X bits;
   generating a high error-detection-byte by exclusive-oring the command byte with the high security byte;
   generating a low error-detection-byte by exclusive-oring the command byte with the low security byte;
   generating a 3X bit error detection code by appending the command byte and the high error-detection-byte to the low error-detection-byte;
   transmitting the error detection code from the first station to the second station;
   receiving the transmitted error detection code at the second station;
   exclusive-oring the high error-detection-byte with the received command byte at the second station to produce a high received security byte;
   exclusive-oring the low error-detection-byte with the received command byte at the second station to produce a low received security byte;
   comparing the high received security byte and the low received security byte with the high and low security bytes of the security code stored in memory at the second station, respectively, to determine if they are identical.

14. A method as set forth in claim 13 further comprising the steps of:
   transmitting an error detected signal from the second station to the first station requesting a retransmission of the data, if the high received security byte and low received security byte do not match the high security byte and low security byte stored at the second station, respectively.

15. A method as set forth in claim 13 further comprising the consecutive steps of:
   generating new security codes at random points in time; and
   storing the new security code at the first station and the second station.

16. A method as set forth in claim 13 wherein the first station comprises a base station of a cordless telephone set and the second station comprises a handset station of a cordless telephone set.

17. A method as set forth in claim 13 wherein the first station comprises a handset station of a cordless telephone set and the second station comprises a base station of a cordless telephone set.

18. A method as set forth in claim 13 further comprising the step of sending a first signal from the second station to the first station if the high and low received security bytes are identical to the high and low security bytes of the security code stored in memory, respectively, and transmitting a second signal from the second station to the first if they are not identical.

19. A method as set forth in claim 13 further comprising the step of:
   sending an acknowledge signal from the second station to the first station if either the high received security byte is identical to the high security byte stored in memory or the low received security byte is identical to the low security byte stored in memory.

20. A method of detecting transmission errors in a digital command byte having X bits transmitted between first and second stations of a cordless telephone comprising the steps of:
   storing a security code at each station, the security code comprising a high security byte having X bits and a low security byte having X bits;
   generating a high error-detection-word by exclusive-oring the command byte with the high security byte;
   generating a low error-detection-byte by exclusive oring the command byte with the low security byte;

generating a 3X bit error detection code by interleaving the bits in the corresponding bit positions of the command byte, high error-detection-byte and the low error-detection-byte, respectively;

transmitting the error detection code from the first station to the second station;

receiving the transmitted error detection code at the second station;

recreating the command byte, high error-detection-byte and low error-detection-byte by reverse interleaving the bits of the received error detection code at the second station;

exclusive-oring the high error-detection-byte with the high security byte stored in memory at the second station to produce a high received command byte;

exclusive-oring the low error-detection-byte with the low security byte stored in memory at the second station to produce a low received command byte;

comparing the high received command byte with the low received command byte at the second station to determine if they are identical.

21. A method of controlling the transmission of command data between a base unit and handset unit of a cordless telephone set comprising the steps of;

storing a digital security code at said base and handset units, generating a validation code at one of said units by interleaving the bits of the security code with the bits of the command data, transmitting the validation code from the one unit to the other unit, and comparing the security code portion of the received validation code to the security code at the other unit.

22. A method as set forth in claim 21 further comprising the step of sending an acknowledgement signal from the other unit to the one unit if a match is detected between the security code portion of the received validation code and the security code at the other unit and sending an error detected signal from the other unit to the one unit if the match is not detected.

23. A method as set forth in claim 21 wherein the security code comprises a high security byte and a low security byte, each portion having X bits, where X is the number of bits comprising the digital command byte, and wherein the validation code generating step is accomplished by interleaving the corresponding bits of the high security byte, command byte and low security byte, respectively, from most significant bit to least significant bit.

24. A method as set forth in claim 21 further comprising the consecutive steps of generating new security codes at random points in time, and storing the new security code at both units.

25. A method of controlling the transmission of command data between a base unit and handset unit of a cordless telephone set comprising the steps of;

storing a digital security code in said units, generating an error detection code at one unit by exclusive-oring the bits of the security code with the bits of the command data, generating a validation code by appending the error detection code to the command data, transmitting the validation code from one unit to the other unit, receiving the validation code at the other unit, exclusive-oring the error detection code portion of the received validation code with the command data portion of the received validation code to produce a security code, and comparing the security code portion of the received validation code to the security code stored at the other station.

26. A method as set forth in claim 25 wherein the step of storing a security code includes storing a code comprised of a high security field and a low security field.

27. A method as set forth in claim 26 wherein said digital security code comprises a high security word and a low security word and wherein the step of generating an error detection code includes the step of generating a high error detection word by exclusive-oring the command data with the high security word and generating a low error detection whereby exclusive-oring the command data with the low security word.

28. A method as set forth in claim 27 wherein the error detection code is generated by appending the command data and the high error detection word to the low error detection word.

29. A method as set forth in claim 28 wherein the exclusive-oring step includes the steps of:

exclusive-oring the high error detection word with the received command data at the other unit to produce a high received security word, exclusive-oring the low error detection word with the received command data at the other unit to produce a low received security field, and the comparing step includes the step of, comparing the high received security word and the low received security word with the high and low security words of the security codes stored in memory in the other unit, respectively, to determine if they are identical.

30. A method of controlling the transmission of command data between a base unit and handset unit of a cordless telephone set, comprising the steps of;

storing a digital security code in said units, generating an error detection code at one of the units by exclusive-oring the bits of the security code with the bits of the command data, generating a validation code by appending the command data to the error detection code, transmitting the validation code from the one unit to the other unit, receiving the validation code at the other unit, exclusive-oring the error detection code portion of the received validation code with the security code stored in the other unit to produce a received restructured command data, and comparing the received restructured command data with the received command data.

31. A method of controlling the transmission of command data between a base unit and a handset unit of a cordless telephone set comprising the steps of;

storing a digital security code at said base and handset units, generating a validation code at one of said units by interleaving at least some of the bits of the security code with at least some of bits of the command data, transmitting the validation code from the one unit to the other unit, and comparing the security code portion of the received validation code to the security code at the other unit.

32. A method of controlling the transmission of command data between a base unit and a handset unit of a cordless telephone set comprising the steps of;
  storing a digital security code at said base and handset units,
  generating a validation code at said one unit by EXCLUSIVE-ORing, some of the bits of the security code with some of the bits of the command data,
  transmitting the validation code from one unit to the other unit, and
  comparing the security code portion of the received validation code to the stored security code at the other station.

* * * * *